United States Patent [19]

San José-Alcalde

[11] 4,338,123

[45] Jul. 6, 1982

[54] METHOD AND APPARATUS FOR THE REDUCTION OF METAL ORES

[75] Inventor: Juan L. San José-Alcalde, Monterrey, Mexico

[73] Assignee: Hylsa, S.A., Monterrey, Mexico

[21] Appl. No.: 237,446

[22] Filed: Feb. 23, 1981

[51] Int. Cl.³ .............................................. C21B 13/02
[52] U.S. Cl. ........................................... 75/34; 75/35; 75/91; 266/156; 266/176; 266/186; 266/191
[58] Field of Search ................ 75/34, 35, 91; 266/156, 266/176, 186, 191

[56] References Cited

U.S. PATENT DOCUMENTS

| | | | |
|---|---|---|---|
| 3,799,521 | 3/1974 | Celada et al. | 266/156 |
| 3,836,131 | 9/1974 | Beggs | 266/186 |
| 3,850,616 | 11/1974 | Cruse, Jr. | 75/34 |

*Primary Examiner*—M. J. Andrews
*Attorney, Agent, or Firm*—Curtis, Morris & Safford

[57] ABSTRACT

A method and apparatus is disclosed for reducing metal ore to sponge metal in a vertical shaft, moving bed, gaseous reduction reactor by controlling the amount of gas intermixing between the reduction and cooling zones of the reactor to result in increased productivity and improved carburization of sponge iron. In accordance with a preferred embodiment, process efficiency is maximized while capital cost is minimized through the use of an optimally designed reactor with a predetermined equivalent height to equivalent diameter ratio.

27 Claims, 4 Drawing Figures

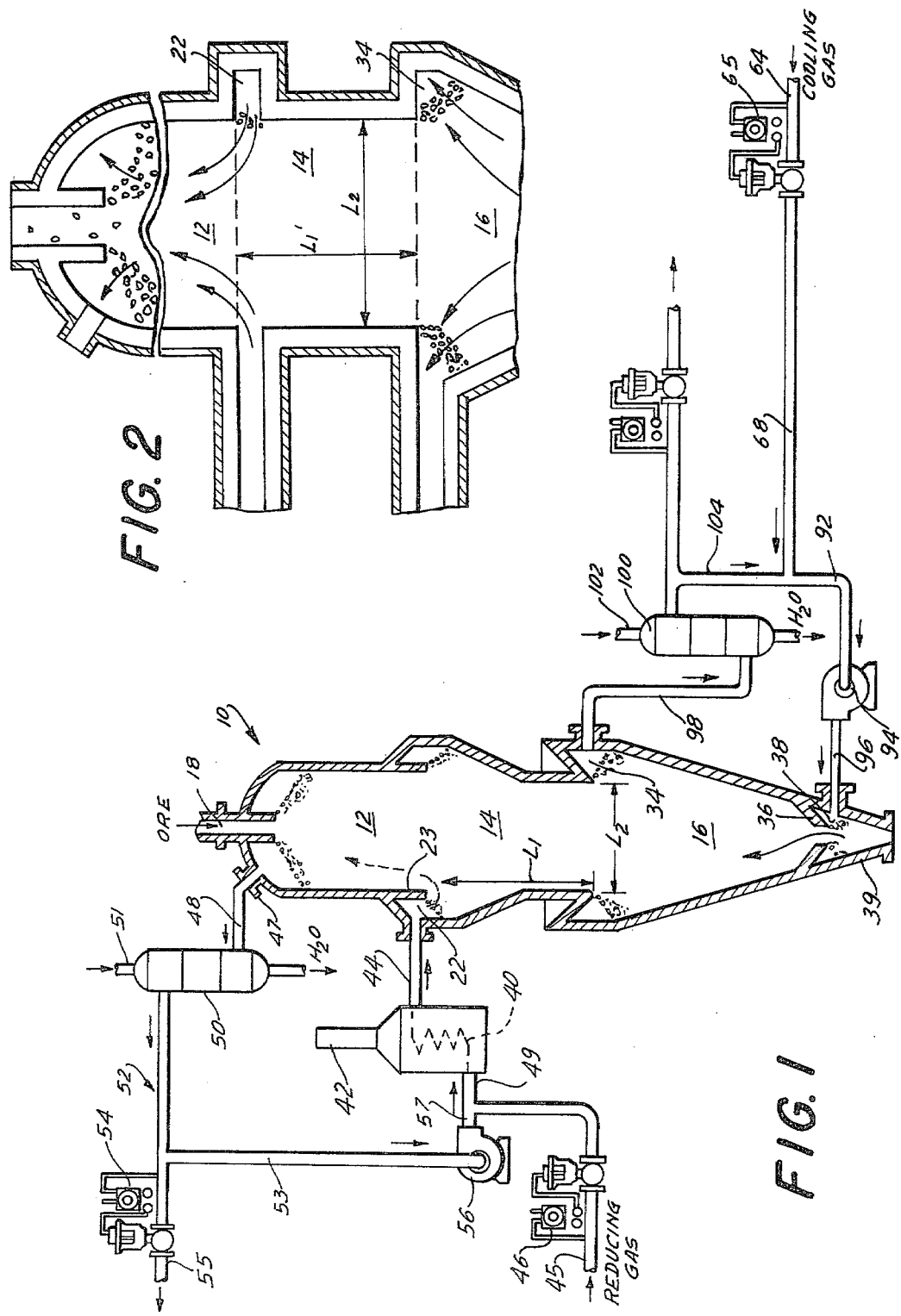

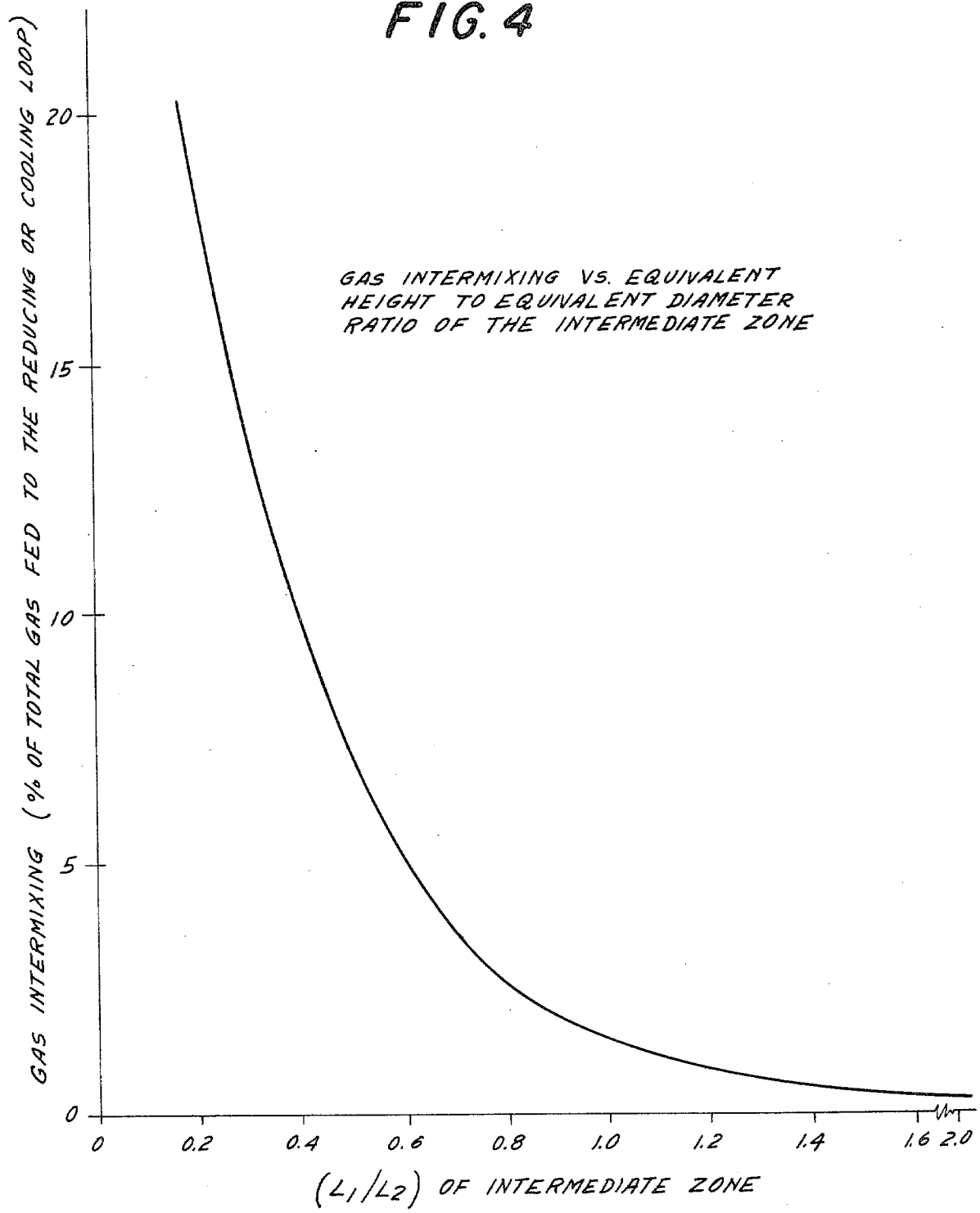

METHOD AND APPARATUS FOR THE REDUCTION OF METAL ORES

FIELD OF THE INVENTION

This invention relates to the gaseous reduction of particulate ores to metals in particulate form in a moving bed, vertical shaft reactor, and more particularly, to an improved method for controlling the reduction of the ore and the cooling of the resulting metal particles. This invention further relates to an optimally designed vertical shaft reactor which provides the capability of increased effective independent control of both the reduction and cooling of the metal particles.

In the following description the process is illustratively described as applied to the reduction of iron ore to sponge iron. However, as the description proceeds it will be evident to those skilled in the art that the invention is also applicable to the treatment of ores other than iron ore.

In general, the production of sponge iron in a vertical shaft, moving bed reactor involves two principal steps, namely, reduction of the ore with a suitable hot reducing gas in a reduction zone of the reactor and then subsequent cooling of the resulting sponge iron with a gaseous coolant in a cooling zone of the reactor. The reducing gas is typically a gas largely composed of carbon monoxide and hydrogen at temperatures of the order of 750° C. to 1100° C., preferably 800° C. to 1000° C. The hot reducing gas is usually introduced at the bottom of the reduction zone and passed upwardly through the reactor to reduce the metal ore therein. In a number of previously proposed processes, cooling of the sponge iron is effected by passing a portion of the reducing gas at relatively low temperature upwardly through the cooling zone of the reactor whereby the reducing gas temperature is increased and the temperature of the sponge iron is reduced.

Very often the sponge iron product from the moving bed, shaft reactor is utilized as all or a portion of the charge to an electric steel-making furnace. It has been found that to maximize economy and efficiency of the furnace operation the sponge iron used must be controllably curburized. Such carburization can be effected by utilizing as a cooling gas a carbon-containing gas which cracks as it passes over the hot sponge iron and deposits carbon thereon. However, to achieve and maintain a particularly desired degree of carburization of the sponge iron, together with the desired cooling effect, the composition and flow rate of the cooling gas must be controlled independent of the conditions existing in the reduction zone of the shaft furnace.

It is also important that the sponge iron be sufficiently cooled prior to discharge from the reactor to avoid re-oxidation of the sponge product upon exposure to the atmosphere while at excessively high temperatures.

If gas streams of different composition and temperature are used in the two zones of the reactor, namely the reduction and cooling zones, there is a tendency for the gases to commingle or intermix between the two zones thereby producing uncontrollable variations in the properties of one or both of the two gas streams. Uncontrolled variations in the compositions, temperatures and flow rates of the reducing and cooling gases will have a debilitating effect on the quality and efficiency of the overall reduction process.

Numerous problems associated with the intermixing of the gases between the reduction and cooling zones have been appreciated in the prior art and attempts have been made to minimize this undesirable gas flow condition. Specifically, U.S. Pat. No. 3,765,872 and U.S. Pat. No. 3,799,521 disclose the advantages of providing an independently controllable cooling gas loop within the shaft reactor as well as an effective method and apparatus for achieving such independent control of the gas flow in the reduction and cooling zones. The solution provided by these prior inventions relates to a method and apparatus for minimizing the commingling of the reducing and cooling gases through the use of a differential pressure controller to maintain the gas pressure at the bottom of the reduction zone substantially equal to the gas pressure at the top of the cooling zone in such a way as to establish an isobaric zone between the reduction and cooling zones. It is further taught that by maintaining the flows of inlet gas and outlet gas from the cooling zone substantially equal, a gas flow pattern in which there is substantially zero net flow of either reducing gas or cooling gas between the reduction and cooling zones is achieved.

Although these prior teachings can be used to effectively reduce and control the intermixing of gases within the shaft reactor, it has now been surprisingly discovered by the inventor that although a condition of zero net flow between the reduction zone and cooling zone of the reactor can be achieved, a portion of the reducing gas in the lower portion of the reduction zone still has a tendency to flow down into the cooling zone while a portion of the cooling gas in the upper portion of the cooling zone has a tendency to flow upwardly into the reduction zone.

Numerous disadvantages are realized as a result of the intermixing of gases between the two zones of the reactor even in situations where the amount of gas flowing between the zones is relatively small. For example, the overall efficiency and economy of the direct reduction process is undesirably affected as a result of the very different gas compositions of the reducing and cooling gases. The exit cooling gas composition typically has a relatively high water and methane content as compared to the reducing gas which typically exhibits a much higher total carbon content with a lower water and methane content. If cooling gas flows into the reduction zone, the methane is reformed locally at a much higher temperature by the catalytic action of the sponge iron to yield carbon monoxide and hydrogen by an endothermic reaction resulting in a decrease in the temperature of the reduction zone. As a result, reduction of the ore in the reduction zone is undesirably affected. On the other hand, if reducing gas with a high carbon content flows into the cooling zone the ore therein is uncontrollably carburized.

Another disadvantage associated with the intermixing of the gases resides in the effect on the overall thermal efficiency of the process. Shunting hot reducing gas from the inlet directly to the cooling zone outlet and then through the cooling quench results in a loss of energy from the previously heated reducing gas.

It has further been discovered that as the reducing and cooling gases flow between the reduction and cooling zones the uniform reduction of ore is appreciably hindered. Since gases will flow in an upwardly direction through the middle of the reactor and flow in the downwardly direction along the walls of the reactor, a non-uniform gas distribution pattern is realized resulting in non-uniform reduction of the ore.

A need therefore exists for a gaseous reduction method and apparatus for the production of a highly metallized sponge iron product while simultaneously providing effective control of the carburization of the sponge iron. A strong need also exists for a method and apparatus for the production of sponge iron with a particularly desired degree of metallization and carburization while simultaneously providing an optionally designed reactor to minimize capital costs while maximizing overall efficiency of the gaseous reduction process.

OBJECTS OF THE INVENTION

It is accordingly an object of the present invention to provide a method and apparatus for the gaseous reduction of metal ores in a vertical shaft, moving bed, ore reduction reactor wherein the productivity of sponge iron with a high metallization is increased.

It is another object of the present invention to provide a method and apparatus for the gaseous reduction of metal ores with an improved capability for controlling the carburization of the sponge iron.

It is still a further object of the present invention to provide a method and apparatus for the gaseous reduction of metal ores with an overall improved thermal efficiency of the reduction and cooling of the sponge iron.

It is yet another object of the present invention to provide an improved method and apparatus for the uniform reduction of iron ore using an optimally designed reactor to yield maximum process efficiency with minimized capital cost.

Other objects of the invention will be in part obvious and in part pointed out hereinafter.

GENERAL DESCRIPTION

As described above, a real need exists for a method and apparatus to effectively control the migration of reducing gas into the cooling zone and of cooling gas into the reduction zone. Although some of the advantages of providing independent control in both the reducing and cooling gas loops have been previously recognized in the art, prior to the present invention attention was primarily focused on a method of achieving and controlling uniform gas flow through the reduction and cooling zones. It was commonly believed that by establishing an isobaric zone within the reactor between the reduction and cooling zone, the net flow of gas through this zone would be zero.

It was further believed by those skilled in the art that if a material balance could be achieved in the reducing and cooling gas loops, a condition of zero net flow could be established between the cooling and reducing zones regardless of the effective distance between the inlet and outlet of both the reducing and cooling gases. cf. "Gas Penetration Problems for Direct Reduction in Shaft Furnaces", Rudolf Jeschar et al., Stahl u. Eisen NR. 17 (August 1979).

One obvious way to minimize the intermixing of gases would be to increase the overall height of the reactor so that the actual distance between the reduction and cooling zones would be increased. However, arbitrarily increasing the height of the reactor would result in an extremely expensive and wasteful reactor design. An alternative method for controlling and minimizing the intermixing of reducing and cooling gases involves the use of inserts within the reactor to disrupt the flow path of the gases therethrough. Such a solution would result in rather substantial increased capital costs and, more importantly, would exhibit an undesirable effect on the gravity mass flow of the ore through the reactor. A third method of minimizing the commingling of gases involves a reactor design provided with a smaller diameter between the reduction and cooling zones to inhibit the flow of gases from one zone to the other. However, if a non-uniform reactor diameter is provided between the reduction and cooling zones a relatively steep conical baffle would be required between the two zones to maintain uniform mass flow. Due to the relatively high temperatures at which the ore is reduced, the ore particles have a tendency to adhere or agglomerate and a conical baffle would tend to arch the particles to form clusters of sponge iron pellets which would interrupt the smooth and uniform mass flow through the reactor. Such a reactor design would be costly and very difficult to operate smoothly.

It has now surprisingly been found by the inventor that even when a substantially isobaric zone is established between the reduction and cooling zones undesirable convective intermixing of the gases will still occur. It has further been found that a correlation exists between the degree of intermixing of the gases between the reduction and cooling zones and the ratio of the equivalent height to equivalent diameter of the intermediate zone between the effective gas inlets and outlets. Through optimization of the reactor design and, more particularly, of the equivalent height and equivalent diameter of the intermediate zone between the reduction and cooling zones, the gases flowing into and out of the reactor can be controllably isolated to obviate the undesirable effects of gas intermixing.

The many objects and advantages of the present invention can best be understood and appreciated by reference to the accompanying drawings which illustrate sponge iron production systems incorporating several embodiments of the apparatus invention, which apparatus is capable of being used to carry out the method of the invention.

BRIEF DESCRIPTION OF THE DRAWINGS

FIG. 1 illustrates diagrammatically a sponge iron production system which comprises a vertical shaft reactor having an intermediate zone located between the reducing and cooling zones thereof.

FIG. 2 illustrates a reactor similar to that illustrated in FIG. 1 wherein the intermediate zone has a substantially constant circular cross-section extending from the top of the cooling zone to the bottom of the reducing zone.

FIG. 4 illustrates a curve of the amount of gas intermixing as a percentage of the total gas fed to either the reducing or cooling zones as a function of the equivalent height to equivalent diameter ratio of the intermediate zone.

DETAILED DESCRIPTION OF THE DRAWINGS

Figure 3:
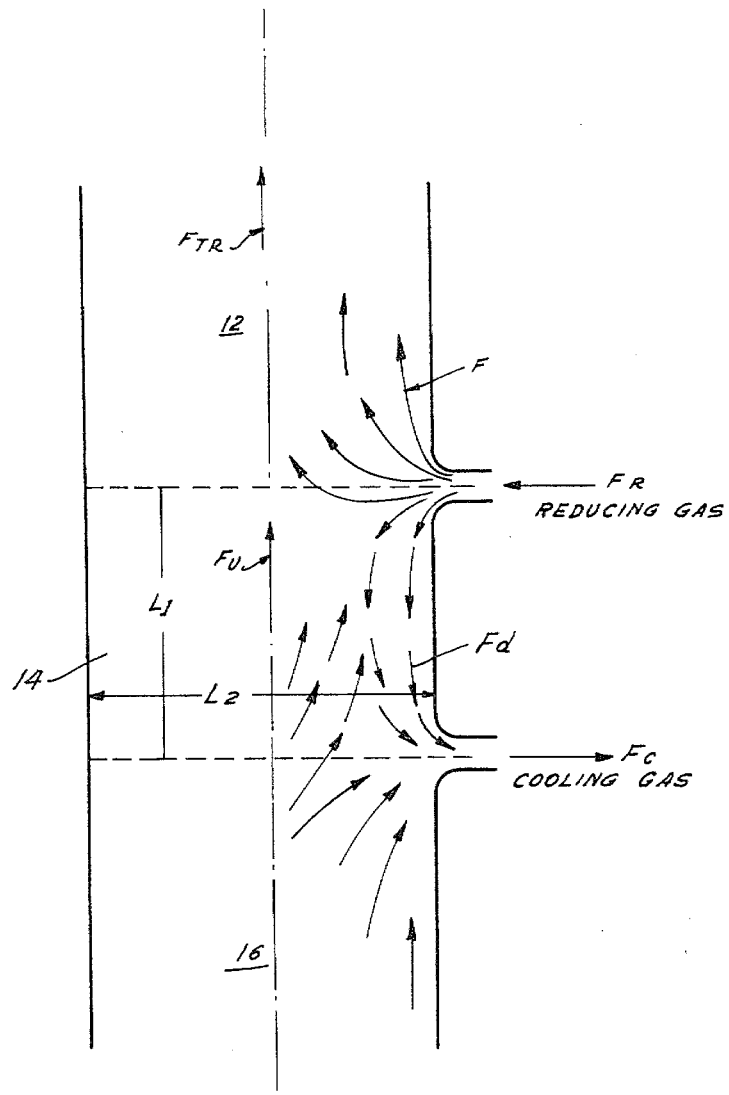
FIG. 3 illustrates the intermixing of the reducing and cooling gases within the reactor.

Turning first to FIG. 1 of the drawings, numeral 10 generally designates a vertical shaft, moving bed reactor having a reduction zone 12 in the upper portion thereof, a cooling zone 16 in the lower portion and an intermediate zone 14 located between the reduction and cooling zones. The reactor 10 is suitably heat insulated and is adaptable to be interiorly lined with a refractory material in a manner known in the art.

The particulate ore which is to be treated is introduced into the reactor 10 through a charging pipe 18. The ore charged to the reactor may be in the form of either lumps or pre-formed pellets or mixtures thereof. Near the lower end of the reduction zone 12 the reactor is provided with an annular plenum chamber 22 which extends around the periphery of the reactor and provides a means whereby reducing gas may be fed to the reactor. A vertical baffle 23 is also provided which, together with the wall of the reactor, defines the annular space 22. The ore moves downwardly through the reduction zone 12 wherein it is largely reduced to sponge iron by upwardly flowing reducing gas.

The reduced iron ore leaving the reduction zone 12 and entering the intermediate zone 14 is generally comprised of elemental iron, ferric carbide and residual amounts of ferric oxide. The inner walls defining the intermediate zone 14 should be designed so as to ensure uniform mass flow of the downwardly moving ore. It is important to minimize the amount of interparticle motion within the ore moving through the upper portion of the reactor which is operated at relatively high temperature.

The reduced iron ore moving downwardly through the intermediate zone 14 enters the cooling zone 16 and is highly metallized and of low carbon content. Near the bottom of the cooling zone 16 there is another annular plenum chamber 38, similar to plenum chamber 22, through which a cooling gas may be fed into the reactor. A frustoconical baffle 36 is also provided which together with the wall of the reactor defines the annular space 38. The sponge iron flows downwardly through cooling zone 16 where it is cooled by the cooling gas flowing therethrough and leaves the reactor through outlet 39.

Turning now to the gas flows in the present system, fresh reducing gas largely composed of carbon monoxide and hydrogen enters the system (from a suitable source not shown) through pipe 45 at a rate controlled by flow controller 46. The reducing gas may be generated, for example, by partial combustion of fuels, coal gasification or by the catalytic reforming of hydrocarbons and steam. Other known types of reducing gas such as coke oven gas may be used in place of reformed natural gas or any of the other previously mentioned sources of reducing gas.

The reducing gas entering the reduction system through pipe 45 flows into pipe 49 and then to a heating coil 40 of heater 42 wherein it is heated to a temperature of about 750° C. to 1100° C., preferably to 800° C. to 1000° C. The heated gas exits heater 42 through pipe 44 and flows into the plenum chamber 22. The reducing gas flows through plenum chamber 22 and into the reactor near the bottom of the reduction zone 12. Upon entering the reactor, the reducing gas flows upwardly through the reduction zone 12 reducing the metal ore therein and is removed near the top of the reactor through a discharge connection 47 and pipe 48.

The gas leaving the reactor through pipe 48 enters a quench cooler 50 into which water is introduced through pipe 51 to cool and effectuate the removal of water in the effluent gas. The gas exits from the cooler 50 through pipe 52 and flows into pipe 53 which connects with the suction side of pump 56. The gas mixture flowing through pump 56 is discharged through pipe 57 and joins with the fresh reducing gas flowing through pipe 45 and is then recycled to the reactor through pipe 49, heater 42, pipe 44 and plenum chamber 22. A portion of the gas stream flowing through pipe 52 may be caused to flow through pipe 55 to a suitable point of use not shown. Pipe 55 is also provided with a back pressure regulator 54 having an adjustable set point for maintaining a desired positive and constant pressure in the system to improve the overall efficiency of reactor 10.

Referring to the right-hand portion of FIG. 1, make-up cooling gas may be supplied from a suitable source (not shown) through pipe 64 at a rate controlled by flow controller 65. The make-up cooling gas flows through pipe 68 to the cooling loop and flows from pipe 68 into pipe 92 and then to the suction side of pump 94. The cooling gas is discharged from pump 94 through pipe 96 and enters the cooling zone 16 of the reactor through plenum chamber 38. The cooling gas flows upwardly through the cooling zone 16 thereby cooling the sponge iron moving downwardly through the reactor.

The cooling gas is removed from the reactor through plenum chamber 34, similar to plenum chambers 22 and 38 and enters pipe 98. The cooling gas then enters quench cooler 100 into which water is introduced through pipe 102 to cool the effluent gas stream. The gas stream then exits from quench cooler 100 through pipe 104. A portion of the gas, after combining with make-up cooling gas from pipe 68, is recycled through pipe 92, pump 94, pipe 96 and plenum chamber 38 to the bottom of the cooling zone 16 of the reactor.

The configuration of the intermediate zone 14 shown in FIG. 1 has an equivalent height, L1, equal to the shortest distance along the vertical axis of the reactor between the effective reducing gas point of injection through plenum chamber 22 to the cooling gas point of removal from plenum chamber 34. The equivalent diameter, L2, is equal to the shortest axial distance between the effective walls of the intermediate zone 14. By the optimization of the intermediate zone 14 the amount of gas intermixing between the reducing and cooling gases is negligible.

Turning now to FIG. 2 of the drawings, the reactor there shown is in most respects similar to that of FIG. 1 and hence its description will be limited to the differences between the two reactors. FIG. 2 illustrates a preferred embodiment of the invention wherein the intermediate zone 14 is designed to have a substantially constant circular cross-section extending from the top of cooling zone 16 to the bottom of reduction zone 12. The equivalent height, L1, is equal to the vertical distance between the effective point of injection of reducing gas to the ore bed through plenum chamber 22 to the effective point of removal of cooling gas from the ore bed through plenum chamber 34 near the top of the cooling zone 16. The equivalent diameter, L2, is equal to the diameter of the circular cross-section of the intermediate zone 14. The embodiment of FIG. 2 is directed to a preferred reactor design in which the overall reduction process is optimized by establishing a condition of essentially zero gas intermixing while minimizing the overall capital cost of the reactor itself.

FIG. 3 is a diagrammatic representation of a preferred reactor design illustrating the present invention.

It will be understood by those skilled in the art that the diagrammatic representation of the reactor shown in FIG. 3 illustrates the gas flow pattern for only half of the reactor cross-section with the gas flows across the cross-section of the remaining half of the reactor being identical to those shown. It will be further understood that the gas inlets and outlets can be arranged as desired anywhere on the periphery of the reactor.

The reduction zone 12, cooling zone 16 and intermediate zone 14 are similar to those shown in FIG. 2 having a substantially constant, circular cross-section wherein the reducing gas is injected near the bottom of the reduction zone 12 and the cooling gas is removed from the reactor near the top of the cooling zone 16. The reducing gas inlet flow rate is shown as $F_R$ and the cooling gas outlet is shown as $F_C$. The stream lines, or flow path, of the reducing gas injected into the reactor shown in FIG. 3 illustrate how a portion of the reducing gas, $F_d$, flows into and downwardly through the intermediate zone 14 while the major portion of $F_R$ flows into and upwardly through the reduction zone 12. Similarly, a portion of the cooling gas outlet flows upwardly into and through the intermediate zone 14 and is shown as $F_u$.

As previously described, an essentially isobaric zone in which the pressure is substantially constant throughout can be established by controlling the flow rates and pressures of the cooling gas and reducing gas loops. When there is zero net flow through the intermediate zone 14 the amount of reducing gas flowing downwardly through the intermediate zone 14, $F_d$, is equal to the amount of cooling gas flowing upwardly through the intermediate zone 14, $F_u$. Therefore, under steady state conditions of zero net flow the total flow rate of reducing gas flowing through the reduction zone 12, $F_{TR}$, is equal to the reducing gas inlet flow rate $F_R$. The flow pattern of the gases through the reactor when the net flow through the intermediate zone 14 is zero can be illustrated by the following equations:

$$F_{TR} = F_R + (F_u - F_d) \quad (1)$$

$$F_u = F_d \quad (2)$$

$$F_{TR} = F_R \quad (3)$$

However, it is clearly shown in FIG. 3 that even under steady state conditions when the net flow through the intermediate zone 14 is zero, (i.e. $F_u = F_d$), there is still intermixing of the reducing and cooling gases. As shown, the reducing gas has a tendency to flow downwardly along the walls of the reactor to the cooling gas point of removal while the cooling gas has a tendency to flow upwardly through the middle of the reactor and into the reduction zone 12.

This unexpected condition of gas intermixing has been found to be of substantial importance since intermixing to a substantial degree makes it extremely difficult to maintain the desired independent gas compositions in each gas loop. Such a condition has an undesirable effect on the degree of reduction and carburization of the sponge iron. Through experimental analysis and computer simulation a correlation between the specific geometric relationship of the intermediate zone 14 and the amount of gas intermixing was derived. Accordingly, the present invention is in the optimization of the relative height and diameter of the intermediate zone of the reactor so as to maximize the efficiency of the reduction process without undesirably affecting the mass flow of ore through the reactor.

FIG. 4 is a curve of the gas intermixing as a percentage of the total gas fed to either the reducing or cooling gas loops as a function of the equivalent height to equivalent diameter ratio of the intermediate zone. The quantification of the intermixing of the reducing and cooling gases separated by an intermediate zone was accomplished by modeling the gas flow patterns through a simulated ore bed in a manner similar to that described by V. Stanek and J. Szekely in the *AIChE. Journal.*, Vol. 20, 5 (1974) pp. 974 to 980; J. Szekely and M.A. Propster in *Transactions of the Iron and Steel Institute of Japan*, Vol. 19 (1977) pp. 21 to 30 and Fried et al. in ICCAD, 2nd International Symposium On Finite Element Methods, Italy June (1976) pp. 695 to 700. Using the mathematical models described in these publications together with conventional experimental laboratory techniques, the data plotted in FIG. 4 was generated and is readily reproducible by one skilled in the art of fluid dynamics and numerical analysis.

The data set forth in FIG. 4 is illustrative of the flow scheme shown in FIG. 1 with L1 being the distance separating the inlet of reducing gas and the outlet of cooling gas and L2 being the equivalent diameter equal to the diameter of the cross-sectional area at the exit of the cooling gas. The intermediate zone is in a zero net flow condition.

Analysis of the results indicates that an L1/L2 ratio greater than about 0.5 results in a negligible amount of intermixing between the two gas loops, i.e. less than 5% of the total gas fed to the reactor. It has been empirically found that when less than 5% of the gas fed to the reactor intermixes there is no appreciable loss in control in the reduction or carburization of the sponge iron. The curve also shows that at low values of L1/L2 the degree of intermixing increases exponentially as L1/L2 is decreased. However, as L1/L2 is increased the degree of intermixing approaches zero asymptotically. It has further been found that although the amount of gas intermixing is extremely low for values of L1/L2 greater than 2.0, as the L1/L2 ratio increases above 2.0 the capital cost of the reactor itself increases substantially to a prohibitive degree.

The upper acceptable limit of intermixing of the gases is determined by the ability to control the metallization and carburization of the sponge iron produced. Accordingly, economical reactor design providing sufficient independent control of the metallization and carburization of the sponge iron has been found to be readily obtainable at $L_1/L_2$ ratios of at least 0.5 up to a ratio of about 2.0. A range of 0.6 to 1.6 has been found to be preferable with the most preferred operating range being 0.7 to 1.2.

It is, of course, to be understood that the foregoing description is intended to be illustrative only in that the embodiments described can be modified in various ways within the scope of the invention. For example, the embodiment shown in FIGS. 1 and 2 in which the inner walls of the intermediate zone 14 are substantially smooth and constant could be of a different configuration provided the equivalent height to equivalent diameter ratio is appropriately adjusted. Similarly, the invention is also useful when feeding cooling gas to the top of the cooling zone 16 while reducing gas is removed near the bottom of the reduction zone 12. In other words, the reducing and cooling gas flows through the reactor could be effectively reversed as compared to those shown in FIGS. 1, 2 and 3.

Further, as pointed out in the beginning of the specification, the present method and apparatus may be used in the reduction of ores other than iron ore, for example, ores of metals such as nickel, copper and tin.

The terms and expressions which have been employed are used as terms of description and not of limitation and there is no intention in the use of such terms and expressions to exclude any equivalents of the features shown and described, or portions thereof, it being recognized that various modifications are possible within the scope of the invention.

I claim:

1. Apparatus for reducing metal ore to metal comprising a vertical shaft reactor adapted to contain a downwardly moving bed of particles of said metal ore said reactor comprising
   a reduction zone in the upper portion thereof and a cooling zone in the lower portion thereof,
   an intermediate zone extending from the top of the cooling zone to the bottom of the reduction zone,
   a first supply conduit connected to the reactor near one end of the reduction zone for feeding hot reducing gas to said bed at a first point of injection,
   first means connected to the reactor near the other end of the reduction zone for removing reducing gas from said bed at a first point of removal,
   a second supply conduit connected to the reactor near one end of the cooling zone for feeding cooling gas to said bed at a second point of injection,
   second means connected to the reactor near the other end of the cooling zone for removing cooling gas from said bed at a second point of removal,
   said intermediate zone having an equivalent height equal to the shortest distance along the vertical axis of the reactor between either the first point of injection or first point of removal, whichever is closest to the bottom of the reduction zone, and either the second point of injection or second point of removal, whichever is closest to the top of the cooling zone, and an equivalent diameter equal to the shortest distance between the effective walls of said intermediate zone,
   the ratio of said equivalent height to said equivalent diameter being in the range of 0.5 to 2.0.

2. The apparatus of claim 1, wherein said metal ore is iron ore.

3. The apparatus of claim 2 wherein said first point of injection is near the bottom of said reduction zone and said second point of removal is near the top of said cooling zone, thereby being adapted to have gaseous flows through the reactor counter-current to the descending moving bed.

4. The apparatus of claim 3 wherein said reactor has a substantially constant circular cross-section along its length from said reduction zone to said cooling zone and terminates in a convergent discharge.

5. The apparatus of claim 4 wherein the equivalent height to equivalent diameter ratio is in the range of 0.6 to 1.6.

6. The apparatus of claim 4 wherein the equivalent height to equivalent diameter ratio is in the range of 0.7 to 1.2.

7. The apparatus of claim 5 wherein said points of removal and of injection each comprise uniform annular gas flow access through the reactor walls.

8. The apparatus of claim 6 wherein said first supply conduit and said second removal means each comprise uniform annular gas flow access through the reactor walls.

9. The apparatus of one of claims 3, 4 or 8, wherein said reactor is free of internal obstructions thus permitting free uniform flow of said metal particles.

10. Apparatus for reducing iron ore to sponge iron comprising a vertical shaft reactor adapted to contain a downwardly moving bed of said iron ore particles, said reactor comprising
    a reduction zone in the upper portion thereof and a cooling zone in the lower portion thereof,
    an intermediate zone having a substantially constant circular cross-section extending from the top of the cooling zone to the bottom of the reduction zone,
    a first supply conduit connected to a substantially uniform annular access port into the reactor near the lower end of said reduction zone for feeding hot reducing gas to said bed at a first point of injection,
    first means connected to the reactor near the other end of the reduction zone for removing reducing gas from said bed at a first point of removal,
    a second supply conduit connected to the reactor near the lower end of the cooling zone for feeding cooling gas to said bed at a second point of injection,
    second means connected to a substantially uniform annular access port into the reactor near the upper end of the cooling zone for removing cooling gas from said bed at a second point of removal,
    said intermediate zone having a height equal to the vertical distance between the top of said second point of removal and the effective lower point of said first point of injection,
    the ratio of the height to the diameter of said intermediate zone being in the range of 0.5 to 2.0.

11. The apparatus of claim 10 wherein the equivalent height to equivalent diameter ratio is in the range of 0.6 to 1.6.

12. The apparatus of claim 10 wherein the equivalent height to equivalent diameter ratio is in the range of 0.7 to 1.2.

13. The apparatus of claim 11, wherein said reactor is free of internal obstructions thus permitting free uniform flow of said solid particles.

14. The apparatus of claim 13, wherein the cooling zone portion of the reactor terminates in a converging cone to a circular discharge.

15. A method for reducing metal ore to metal in a vertical shaft moving bed reactor which comprises
    establishing and maintaining a reduction zone in the upper portion thereof in which a hot reducing gas largely composed of carbon monoxide and hydrogen is caused to flow countercurrent therethrough to reduce the metal ore thereof to metal, a cooling zone in the lower portion of the reactor in which a cooling gas is caused to flow countercurrent therethrough to cool the metal therein and an intermediate zone extending from the top of said cooling zone to the bottom of said reducing zone,
    feeding said hot reducing gas into the lower end of said reduction zone to a first point of injection,
    removing said reducing gas at a first point of removal in the upper end of said reduction zone,
    feeding said cooling gas into the lower portion of said cooling zone to a second point of injection,
    removing said cooling gas at a second point of removal in the upper end of said cooling zone,
    minimizing intermixing of any reducing gas flowing through said reduction zone with any cooling gas flowing through said cooling zone by establishing a substantially optimized intermediate zone having an equivalent height equal to the vertical distance between said first point of injection and said second point of removal and an equivalent diameter equal to the shortest distance between the effective walls of said intermediate zone, said intermediate zone having an equivalent height to equivalent diameter ratio in the range of 0.5 to 2.0.

16. The method of claim 15 wherein the particulate metal ore is iron ore.

17. The method of claim 16 wherein the equivalent height to equivalent diameter ratio of said intermediate zone is in the range of 0.7 to 1.6.

18. The method of claim 17 wherein said intermediate zone is substantially isobaric, in terms of a material balance in the gaseous flows in the reactor.

19. The method of claim 17 wherein said intermediate zone is substantially isothermal.

20. The method of claim 17 wherein the descending flow of said moving bed of particles is of substantially uniform cross-section through said intermediate zone.

21. The method of claim 20 wherein the intermediate zone is of substantially constant circular cross-section and free of internal obstructions to permit the free uniform flow of said metal particles.

22. The method of claims 20 or 21 wherein said reducing gas is fed to said first point of injection through an annulus and said cooling gas is removed from said second point of removal through an annulus.

23. The method of claim 16, wherein said intermediate zone is free of obstructions to permit the free uniform flow of said metal particles.

24. The method of claim 20, wherein said intermediate zone is free of obstructions to permit the free uniform flow of said metal particles.

25. The method of claims 15 to 21, 23, or 24, comprising establishing a zero net flow condition through said intermediate zone, with intermixing between the reducing gas and the cooling gas therethrough being at a value no greater than 5% of the gas fed to the reactor.

26. The apparatus of claims 1, 4, 6, or 14, wherein said ratio is sufficiently great, when said intermediate zone is in a zero net flow condition, so as to limit the equalized downward flow of reducing gas and the upward flow of cooling gas to less than 5% of the gas fed to the reactor.

27. The apparatus of claim 9, wherein said ratio is sufficiently great, when said intermediate zone is in a zero net flow condition, so as to limit the equalized downward flow of reducing gas and the upward flow of cooling gas to less than 5% of the gas fed to the reactor.

* * * * *